United States Patent [19]

Goor

[11] Patent Number: 5,076,389

[45] Date of Patent: Dec. 31, 1991

[54] ENGINE BLOCK MOUNT

[75] Inventor: Dan Goor, Colorado Springs, Colo.

[73] Assignee: Goor Associates, Inc., Colorado Springs, Colo.

[21] Appl. No.: 630,172

[22] Filed: Dec. 19, 1990

[51] Int. Cl.⁵ .................... B60K 5/00; B62D 21/15
[52] U.S. Cl. .................................. 180/232; 280/784; 248/637
[58] Field of Search ............... 180/232, 312, 294, 298, 180/299; 280/784; 248/637; 384/58; 296/35.2

[56] References Cited

U.S. PATENT DOCUMENTS

| | | | |
|---|---|---|---|
| 3,638,748 | 2/1972 | Tixier | 280/784 |
| 3,718,304 | 2/1973 | Schulz et al. | 248/9 |
| 3,815,703 | 6/1974 | De Lorean et al. | 180/91 |
| 3,851,722 | 12/1974 | Grosseau | 180/82 R |
| 3,860,258 | 1/1975 | Feustel et al. | 280/106 R |
| 3,869,017 | 3/1975 | Feustel et al. | 180/82 R |
| 3,896,739 | 7/1978 | Crofts | 105/133 |
| 4,031,978 | 6/1977 | Taylor | 180/91 |
| 4,067,524 | 1/1978 | Brinkmann | 248/9 |
| 4,073,357 | 2/1978 | Danckert | 180/64 R |
| 4,091,888 | 5/1978 | Yamanaka et al. | 180/82 R |
| 4,181,192 | 1/1980 | Danckert | 180/232 |
| 4,238,104 | 12/1980 | Hamilton | 248/566 |
| 4,822,010 | 4/1989 | Thorn | 267/140 |
| 4,919,474 | 4/1990 | Adachi et al. | 296/194 |

Primary Examiner—Charles A. Marmor
Assistant Examiner—Paul Dickson
Attorney, Agent, or Firm—Weingarten, Schurgin, Gagnebin & Hayes

[57] ABSTRACT

The invention provides a vehicle engine block mount whereby an engine is mounted on a set of rails having springs biased in outward and inward directions for separating the inertial load of the engine from the automobile frame in the event of a substantial frontal impact. The set of rails are longitudinally mounted within the vehicle to direct the engine inward and downward into the ground by virtue of creating a path-of-least-resistance which, upon an impact of substantial magnitude, will prevent the engine block from invading the passenger compartment. The engine block is mounted to the rails by bearings which provide dampening of engine vibration and permit forward and backward movement against the springs during impact. In another embodiment of the invention, pivots are located towards the front of the engine block and bearings are located in the back of the block and guided by tracks which direct the engine towards the ground in the event of collision. The invention therefore provides an apparatus which absorbs a significant amount of impact force and which redirects it towards the ground.

18 Claims, 2 Drawing Sheets

ENGINE BLOCK MOUNT

FIELD OF THE INVENTION

The invention relates to the front end body structure of motor vehicles, and more particularly to the mounting of engines.

BACKGROUND OF THE INVENTION

Automobile frame and body designs have taken into account the need for absorbing the impact of frontal collisions. To this end, U.S. Pat. No. 3,869,017 provides an example of an impact absorbing system for a motor vehicle containing both a plastically deformable energy absorbing frame section and break-away engine mounts which fracture in the event of a catastrophic collision and permit the engine to separate from the frame. Once the engine is separated, according to this design, the frame sections need support only the inertia load of the vehicle body. However, the design does not prevent the engine from invading the passenger compartment, where it can cause injuries to occupants.

In similar fashion, U.S. Pat. Nos. 3,718,304, 3,851,722, 4,073,357, and 4,181,192 disclose energy absorbing chassis members having severable engine mounts which allow the engine blocks to be severed from the frame in the event of a substantial impact or when a critical deceleration rate is reached. However, the releasable mounts disclosed therein do not necessarily work in cooperation with each other, so that in offset frontal impacts the engine may be only incompletely released from the frame. There is no teaching, furthermore, as to how dislocation of the engine block is controlled.

An energy absorbing motor mount assembly is disclosed in U.S. Pat. No. 4,238,104 wherein a pair of mounting elements are attached to arms that extend downward into containment housings with resilient springs for frontward and backward movement. Presumably, energy absorption is provided in fore and aft directions, but the assembly does not provide for, and in fact teaches against, the decoupling of the engine from the mounts in substantial impacts.

In view of the foregoing disadvantages, an engine block mount is needed for decoupling the inertia body of the engine from the vehicle frame while controlling its position relative to the frame during substantial impacts.

SUMMARY OF THE INVENTION

In surmounting the foregoing disadvantages, the present invention provides an engine block mount assembly comprising a set of longitudinally arranged rails having outwardly and inwardly biased springs for permitting movement of the engine during impact. The inward ends of the rails are curved downwards so that in an impact of substantial force the engine is directed inwards and toward the ground to prevent invasion of the passenger compartment by the engine block. The engine block is mounted on or to the rails by bearings which provide dampening of engine vibration and permit movement of the engine along the rails.

Unlike engine mountings of the prior art, the teaching of the present invention includes consideration of the relative positions of the engine block and automobile frame at different stages of impact: (1) when the engine moves forward (i.e., outward from the passenger compartment) while the nose of the vehicle begins to collapse; (2) when the engine meets the object into which the automobile has collided; and (3) when the engine rebounds rearward (towards the passenger compartment) after imparting its momentum into the colliding object. During each of these stages, the inertia load of the engine block is decoupled from the frame; yet the weight of the engine block is used advantageously to counter the momentum, if any, from the colliding object. As more of the frame collapses, the engine block is directed downward away from the passenger compartment by virtue of the downward path-of-least-resistance provided for the movement of the engine block. In another embodiment of the invention, pivots are used near the front of the engine block instead of bearings. However, the same purpose of directing the engine downwards on tracks using bearings located near the inward portion of the engine block is achieved, and this provides the engine with a path of less resistance than would otherwise be available if the engine block were to be fixed by conventional mounts to the automobile frame.

Consequently, the present invention provides the ability to decouple the inertia of engine mass from the frame while retaining control over the movement of the engine block. The invention provides passenger safety even in offset frontal collisions which would otherwise thwart the purposes of designs which employed releasable, shearable, or slidable mounts that do not work cooperatively with other mounts to absorb the energy of collision.

DESCRIPTION OF THE DRAWINGS

A more complete understanding of the present invention and attendant advantages and features thereof will be more readily understood by reference to the following detailed description when considered in conjunction with the accompanying drawings wherein.

DETAILED DESCRIPTION OF THE INVENTION

Figure 1:
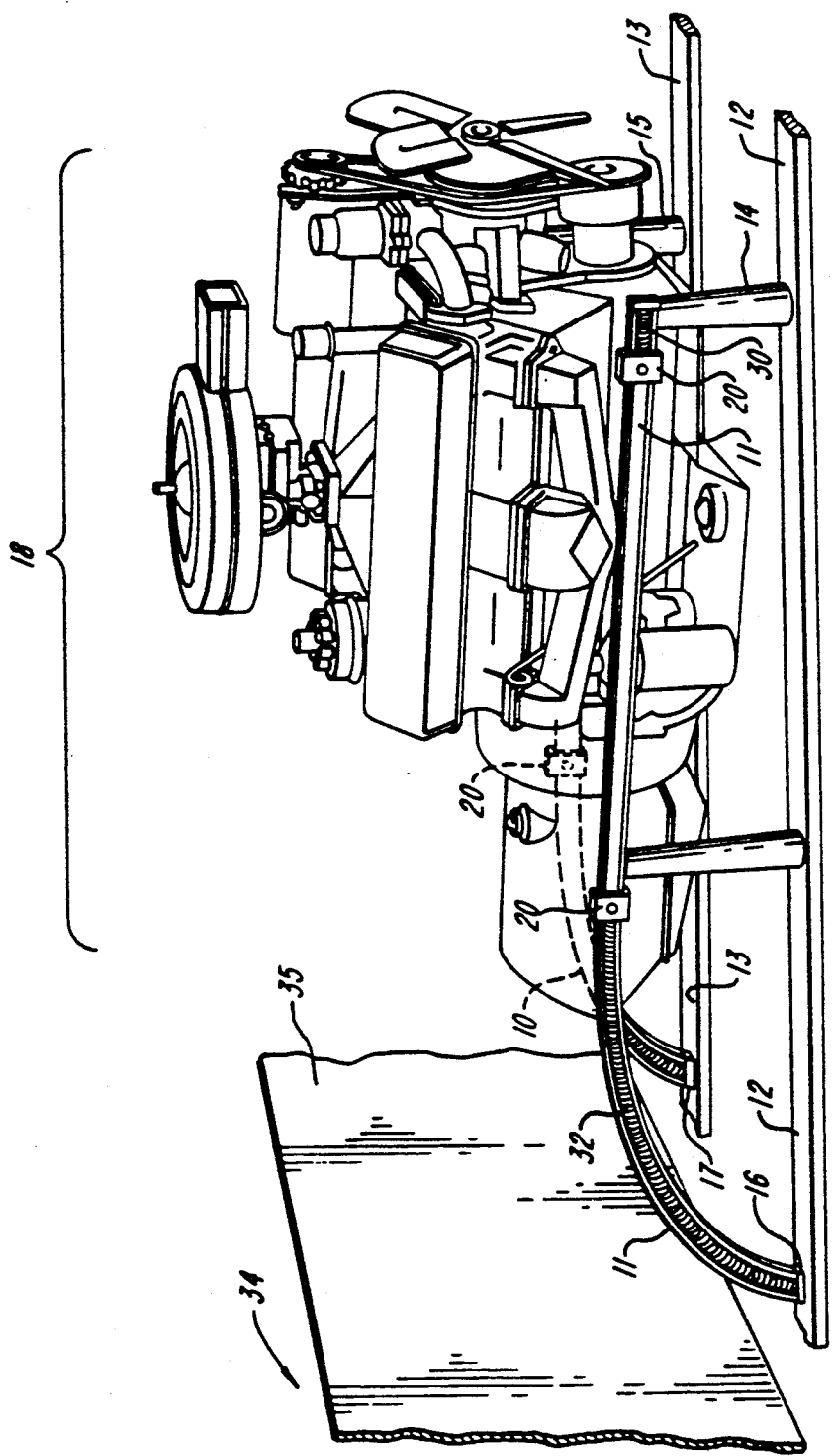
FIG. 1 is a diagrammatic side view of an engine block mount system of the present invention on an automobile frame.

FIG. 1 illustrates an exemplary embodiment of the engine block mount of the present invention. The engine block mount assembly comprises a set of rails 10 and 11 longitudinally arranged with respect to the automobile frame designated generally at 12 and 13. The front ends of the rails 10 and 11 are connected to automobile frame members 12 and 13 by means of connecting members 14 and 15, and the rear ends of the rails 10 and 11 are connected to the frame members 12 and 13 at points designated as at 16 and 17. As a variety of automobile frame shapes is possible, it is to be understood that connection of rails 10 and 11 to frame members 12 and 13, or to a unitary frame, may be accomplished by means known in the art, so long as the rearward portion of the rails are directed towards the ground to permit an engine block 18 mounted thereon to avoid the passenger compartment 34 of the vehicle.

The engine block 18 is mounted to the rails 10 and 11 by a set of bearings, designated as at 20, which permit the engine block 18 to move forward and rearward along the rails 10 and 11. A biasing means, such as springs 30, may be placed within the rails to exert a biasing force to resist the forward movement of the engine block 18 along the rails 10 and 11. Springs 32 may similarly be placed in the rearward ends of the rails 10 and 11 to exert a forward biasing force to resist the rearward movement of the engine block 18 along the rails. The biasing springs 30 and 32 are selected and adjusted to permit movement of the bearing-mounted engine block only when a certain force is reached, such as in substantial frontal collisions.

During the initial phase of a collision having substantial force of impact, the frontmost portions of the automobile frame 12 and 13 begin to collapse, and the engine block 18 moves forward along the rails 10 and 11 while being resisted by the rearward-biased springs 30. During impact between the engine block 18 and the object (not shown) into which the automobile collides, the momentum of the engine block 18 is transferred into the object to counter the momentum, if any, of the object; and thereafter the engine block moves rearward along the rails 10 and 11 against the forward-biased springs 32 and towards the ground along the downwardly-directed rear ends of the rails located near the frame at 16 and 17. Thus, once the engine block 18 has absorbed most of the frontal impact, the rails direct the absorbed energy of the impact towards the ground and away from the passenger compartment 34 located behind the firewall 35.

Figure 2A:
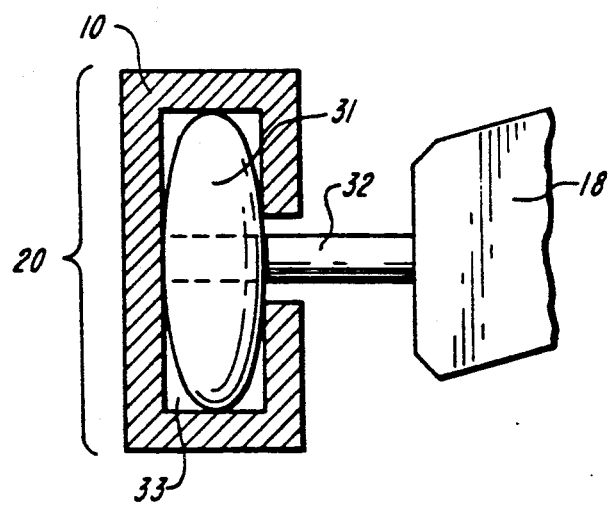
FIG. 2a is a cross-sectional view of a rail and bearing of an engine block mount system according to the invention.
Figure 2B:
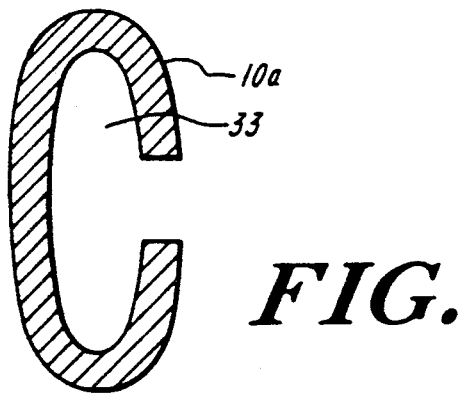
FIG. 2b is a cross-sectional view of an oval-shaped rail employed in the invention.

FIG. 2a shows an embodiment of the invention in which a bearing 31 connected by a connecting member 32 to the engine block 18 travels within a channel 33 defined by a rail shown at 10. The cross-sectional shape of the rail 10 may be any form so as to house a channel for the bearings 20, and may assume a circular or oval shape which is bent out of one piece of metal, as shown generally at 10a in FIG. 2b. The bearing 20 may be rotatably mounted on the connecting member 32, or fixed on the elongated member 32 so as to slide within the rail channel 33 as shown in FIG. 2a.

Figure 3:
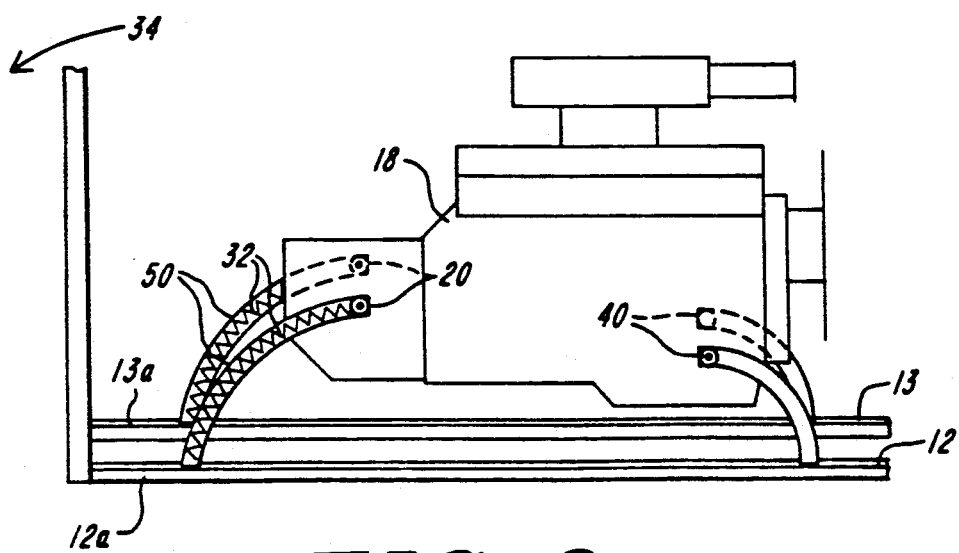
FIG. 3 is a diagrammatic side view of an engine block mount system of the present invention on an automobile frame with front pivots.

FIG. 3 shows another embodiment of the invention in which pivots 40 located on either side of the engine block 18 near the front of the engine are connected to the automobile frame portions 12 and 13 at a point relatively low to the ground. The rear of the engine block 18 has bearings 20 attached on either side of the engine block 18 and moveably attached to a pair of rails 50 which direct the engine 18 downwards upon a substantial impact which crumples the frame at portions designated generally as at 12a and 13a. The invasion of the passenger compartment 34 by the engine block 18 is thereby avoided.

Damping material such as rubber or other material may be packed between the bearings 20 and springs 30 and 32, or within the springs, so as to contribute to the ability of the engine block system to absorb engine vibration.

Although the present invention is well-suited for automobiles, it is also applicable for use in other motor vehicles such as trucks, vans, or buses. Moreover, the present invention is also applicable to rear-engine driven vehicles, since it will be understood that when such vehicles are struck from the rear, the engine block is similarly susceptible to invading the passenger compartment. In such an application, the rails will be disposed so that curved ends will direct the rear-mounted engine block forward and toward the ground in a direction away from the passenger compartment.

A variety of modifications and variations are possible in light of the above teachings without departing from the scope and spirit of the invention, which is limited only by the following claims.

What is claimed is:

1. An engine block mount assembly for a passenger vehicle, comprising:
   a set of rails longitudinally disposed in the vehicle, each of said rails having a first portion disposed in a direction away from the passenger compartment of the vehicle, and a second portion curving towards the ground;
   at least one bearing located on each side of the engine and movably attached to said set of rails to direct movement along said first and second portions of said rails;
   a connecting member for connecting said bearings to the engine block, whereby the connected engine can travel along said rails;
   means for biasing the engine block in a direction away from said first rail portions; and
   means for biasing the engine block in a direction away from said second rail portion curving towards the ground.

2. The engine block mount assembly of claim 1 wherein said biasing means are springs.

3. The engine block mount assembly of claim 1 wherein said biasing means further provide dampening to engine vibration.

4. The engine block mount assembly of claim 1 further including dampening material placed between said bearings and said biasing means.

5. The engine block mount assembly of claim 1 wherein said rails have a cross-sectional oval shape.

6. The engine block mount assembly of claim 1 wherein said bearings are rotatably mounted within said rails.

7. The engine block mount assembly of claim 1 wherein said biasing means permit movement of the engine block along said rails only when a predetermined level of force is reached.

8. The engine block mount assembly of claim 1 wherein said connecting members are rotatably fixed to the engine block.

9. The engine block mount assembly of claim 1 wherein said rails contain grooves for movably engaging said bearings and permitting the engine block to travel along said rails.

10. An engine block mount assembly for a passenger vehicle, comprising:
    a set of rails longitudinally disposed in the vehicle and curving towards the ground;
    at least one bearing located on each side of the engine and movably attached to said set of rails to direct movement along said rails;
    a connecting member for connecting said bearings to the engine block, whereby the connected engine can travel along said rails;
    a pivot located on each side of the engine, said pivot attached to the engine and to a portion of the frame of the vehicle at a distance from said rails and at a point low to the ground to permit rotation of the engine with respect to the frame of the vehicle and redirection of its movement toward the ground along said rails when the distance between said rails and said pivots is decreased during a collision involving the vehicle; and means for biasing the engine block in a direction away from said rail portions.

11. The engine block mount assembly of claim 10 wherein said biasing means are springs.

12. The engine block mount assembly of claim 10 wherein said biasing means further provide dampening to engine vibration.

13. The engine block mount assembly of claim 10 further including dampening material placed between said bearings and said biasing means.

14. The engine block mount assembly of claim 10 wherein said rails have a cross-sectional oval shape.

15. The engine block mount assembly of claim 10 wherein said bearings are rotatably mounted within said rails.

16. The engine block mount assembly of claim 10 wherein said biasing means permit movement of the engine block along said rails only when a predetermined level of force is reached.

17. The engine block mount assembly of claim 10 wherein said connecting members are rotatably fixed to the engine block.

18. The engine block mount assembly of claim 10 wherein said rails contain grooves for movably engaging said bearings and permitting the engine block to travel along said rails.

* * * * *